United States Patent
Muller et al.

(10) Patent No.: US 9,011,982 B2
(45) Date of Patent: Apr. 21, 2015

(54) METHOD FOR A LAYER-WISE MANUFACTURING OF A THREE-DIMENSIONAL OBJECT

(75) Inventors: Frank Muller, Furstenfeldbruck (DE); Andreas Pfister, Munich (DE); Martin Leuterer, Olching (DE); Peter Keller, Krailling (DE)

(73) Assignee: EOS GmbH Electro Optical Systems, Krailing (DE)

(*) Notice: Subject to any disclaimer, the term of this patent is extended or adjusted under 35 U.S.C. 154(b) by 1199 days.

(21) Appl. No.: 12/154,655

(22) Filed: May 23, 2008

(65) Prior Publication Data

US 2009/0017220 A1    Jan. 15, 2009

(30) Foreign Application Priority Data

May 25, 2007    (DE) .......................... 10 2007 024 469

(51) Int. Cl.
  *B05D 3/06*    (2006.01)
  *B29C 67/00*   (2006.01)

(52) U.S. Cl.
  CPC .................................. *B29C 67/0077* (2013.01)

(58) Field of Classification Search
  USPC .......................................... 427/493, 508, 517
  See application file for complete search history.

(56) References Cited

U.S. PATENT DOCUMENTS

| | | | |
|---|---|---|---|
| 4,586,068 A * | 4/1986 | Petroff et al. | ................. 257/438 |
| 4,945,032 A | 7/1990 | Murphy et al. | |
| 5,429,908 A | 7/1995 | Hokuf et al. | |
| 5,640,667 A | 6/1997 | Freitag et al. | |
| 5,658,412 A | 8/1997 | Retallick et al. | |
| 5,730,925 A | 3/1998 | Mattes et al. | |
| 5,904,890 A | 5/1999 | Lohner et al. | |
| 5,908,569 A | 6/1999 | Wilkening et al. | |
| 5,985,204 A | 11/1999 | Otsuka et al. | |
| 6,107,008 A | 8/2000 | Howell et al. | |
| 6,155,331 A * | 12/2000 | Langer et al. | ................. 164/456 |

(Continued)

FOREIGN PATENT DOCUMENTS

| | | |
|---|---|---|
| CN | 1426335 | 6/2003 |
| DE | 43 00 478 | 8/1994 |

(Continued)

OTHER PUBLICATIONS

Keller, "Rapid Prototyping: Grundlagen zum selektiven Lasersintern von Polymerpulver" Shaker Verlag, 2nd paragraph, p. 28, 1999.

(Continued)

*Primary Examiner* — Elena T Lightfoot
(74) *Attorney, Agent, or Firm* — Seyfarth Shaw LLP (57) ABSTRACT

A method for a layer-wise manufacturing of a three-dimensional object has a first step of providing a layer of a material in powder form or a liquid material on a support or a layer that has already been solidified at selected positions previously and a second step of directing a focussed photon or particle beam (8') selectively at selected positions of the layer. In the second step, the photon or particle beam is selected such that it brings about a change of the absorption of the material when hitting the layer. After the termination of the second step, a third step is carried out, in which the layer is irradiated by means of electromagnetic radiation (18') such that the material is homogenously solidified at those positions of the layer that correspond to the cross-section of the object to be formed.

20 Claims, 3 Drawing Sheets

(56) References Cited

U.S. PATENT DOCUMENTS

| | | | |
|---|---|---|---|
| 6,217,816 | B1 | 4/2001 | Tang |
| 6,556,339 | B2 * | 4/2003 | Smith et al. .................. 359/334 |
| 2004/0094728 | A1 | 5/2004 | Herzog et al. |
| 2006/0134419 | A1 * | 6/2006 | Monsheimer et al. ........ 428/402 |
| 2007/0126159 | A1 | 6/2007 | Simon et al. |
| 2007/0183918 | A1 | 8/2007 | Monsheimer et al. |
| 2007/0238056 | A1 | 10/2007 | Baumann et al. |
| 2007/0241482 | A1 * | 10/2007 | Giller et al. .................. 264/494 |

FOREIGN PATENT DOCUMENTS

| | | |
|---|---|---|
| DE | 44 12 160 | 10/1994 |
| DE | 195 16 972 | 12/1996 |
| DE | 196 06 128 | 8/1997 |
| DE | 198 18 469 | 10/1998 |
| DE | 199 53 000 | 5/2001 |
| DE | 10 2004 012 682 | 10/2005 |
| DE | 10 2004 012 683 | 10/2005 |
| DE | 10 2004 020 452 | 12/2005 |
| DE | 10 2005 048 314 | 4/2007 |
| DE | 102005048314 | 4/2007 |
| DE | 10 2005 054 723 | 5/2007 |
| RU | 2005122938 A | 1/2006 |
| WO | WO-97/43696 | 11/1997 |
| WO | WO-01/81031 | 11/2001 |
| WO | 2004058487 A1 | 7/2004 |
| WO | WO-2005/011959 | 2/2005 |
| WO | WO-2005/090056 | 10/2005 |
| WO | WO-2005/105412 | 11/2005 |

OTHER PUBLICATIONS

Haack et al., "Non-Contact Marking by Laser Beam", Polymeric Materials, Kunststoffe/German Plastics Nov. 1993.

Sauer, "Optimization of component properties in the selective laser sintering of thermoplastics, Manufacturing technology reports", Shaker Verlag, 2005.

"The art of laser marking et al.", Miyachi Europe Corporation, Aug. 23, 2010.

Wilkening, "Laser sintering as Rapid Prototyping process—opportunities and limits", Dissertation, Department of Precision Engineering and Microtechnology, 1997.

"LATI Thermoplastics Laser Marking", LATI Industria Termoplastici S.p.A., Jan. 8, 2008.

* cited by examiner

METHOD FOR A LAYER-WISE MANUFACTURING OF A THREE-DIMENSIONAL OBJECT

FIELD OF THE INVENTION

The present invention is related to a method for manufacturing a three-dimensional object by means of a rapid prototyping method. In particular, it is related to a method, in which a material in powder form is applied layer-wise onto a support and is selectively solidified at those positions that correspond to the cross-section of an object to be manufactured layer-wise.

BACKGROUND OF THE INVENTION

Methods, in which a quick manufacturing of prototypes based on construction data is possible, are termed rapid prototyping methods. As a rule the part to be manufactured is built layer-wise from a shapeless material or a material being neutral with respect to shape. For instance, U.S. Pat. No. 5,730,925 describes a method, in which layers of a powder are applied onto a support that can be vertically moved and are selectively sintered by means of a laser at those positions that correspond to the cross-section of the object to be manufactured.

Figure 3:
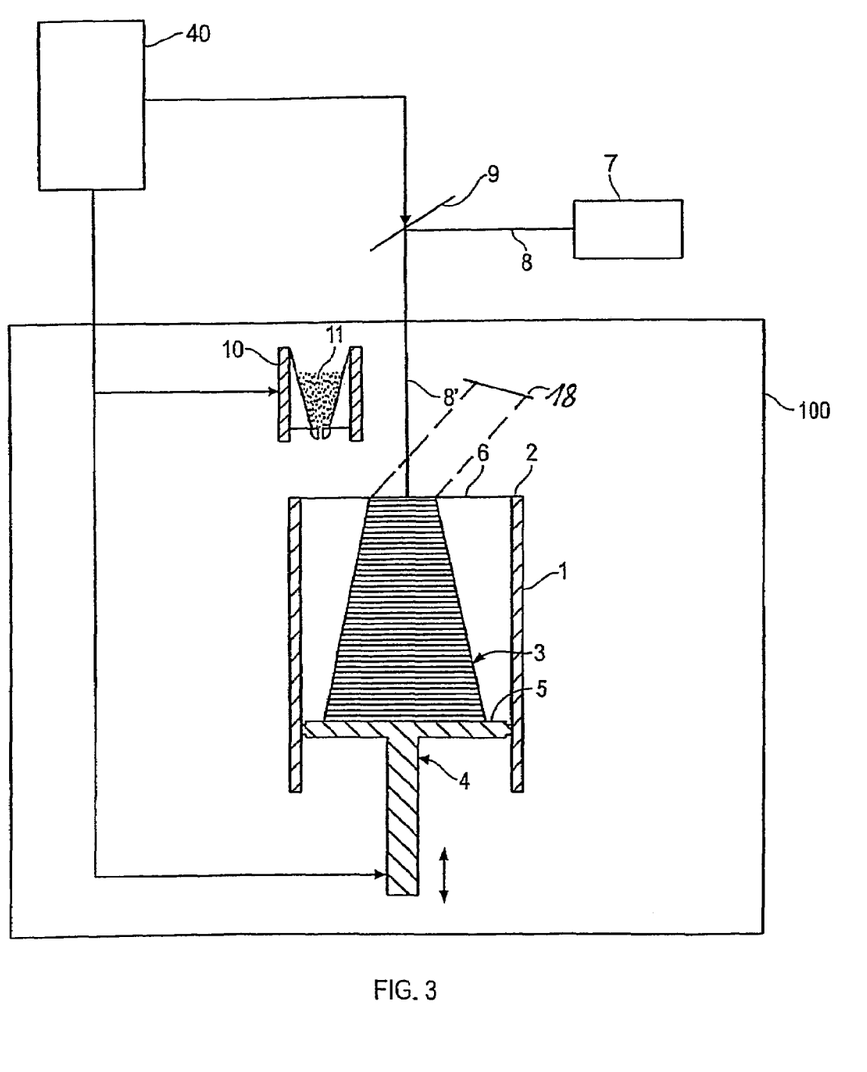
FIG. 3 shows a laser sintering device for a layer-wise manufacturing of a three-dimensional object.

As an example FIG. 3 shows such a laser sintering device. As is apparent from FIG. 3, the device comprises a container 1 that is limiting the building space. This container is open to the top and is limited at the bottom by a support 4 for supporting an object 3 to be formed. By the upper edge 2 of the container (respectively its sidewalls) a work plane 6 is defined. The object to be formed is located on the upper side of the support 4 and is formed from a plurality of layers of a building material in powder form that can be solidified by means of radiation, which are in parallel to the upper side of the support 4. Here, the support can be shifted in a vertical direction, i.e. in parallel to the sidewall of the container 1, by means of a height-adjusting device. Thereby the position of the support 4 with respect to the work plane 6 can be adjusted.

An application device 10 for applying the powder material 11 to be solidified onto the support surface 5 or a previously solidified layer is provided above the container 1 and the work plane 6, respectively. Further, an irradiation device in the form of a laser 7 is arranged above the work plane 6, which irradiation device emits a directed light beam 8. By means of a deflection device 9 such as a rotating mirror this light beam 8 is directed as deflected beam 8' towards the work plane 6.

In order to manufacture a three-dimensional object 3, at first the support 4 is moved to the uppermost position by means of the height-adjusting device. In the uppermost position the surface of the support 4 lies at a distance corresponding to the layer thickness of the first layer to be applied below the upper edge 2. Then the application device 10 is moved across the work plane. In the process powder is released and forms the first layer on the support surface. Then via the deflection device 9 the laser 7 is directed such that the deflected light beam hits all desired positions meaning those positions in this layer that correspond to the object and solidifies the powder material there by means of sintering.

In a second step the support is lowered by the amount of the thickness of the next layer and again a powder layer is applied, whereupon the irradiation step is repeated at the positions corresponding to the cross-section of the object in this layer. The steps are repeated until the object has been completed.

In the above described manufacturing of a three-dimensional object the temperature of the material must lie within a definite process window in order to guarantee a good quality of the three-dimensional object. Therefore, out of this reason normally a powder layer to be solidified by means of the laser is pre-heated by a radiant heating 18 such that the medium temperature of the layer lies within the process window. In the process preferably infrared radiators are used as radiant heaters 18.

Though the above described method has proven its value for manufacturing parts that are accurate in shape in a small series (prototyping), it still can be improved in some points:

As the solidification of the powder material is effected pointwise each position to be solidified has to be individually approached by the laser, which is time-consuming.

In order to solidify the material by means of the laser, a laser has to be used that can provide sufficient energy for melting the material at least partially. As a rule such a laser, for example a $CO_2$ laser, is expensive when being acquired and serviced. Further, the high amount of energy that is emitted by the laser, leads to the fact that a cooling has to be added, which cools not only the laser itself but also for example a mirror system that is used as deflection device. This makes the whole system slower and in addition leads to a slower exposure process due to the high masses to be moved.

In order to accelerate the manufacturing method, WO 2005/011959 A1 proposes to apply absorption-increasing or -lowering substances here and there on a layer that is to be selectively solidified and to perform afterwards an irradiation by means of an areal heating. Then, due to the differences in the absorption behaviour it is possible to achieve a selective sintering of the material in the layer. However, the saving in time by the large-area irradiation is paid for by time losses due to the application of an additional layer of absorber substances. Furthermore, material geometries as small as desired can not be provided by the application of absorber substances.

In order to make a laser sintering device more cost-effective, DE 10 2004 012 682 A1 proposes to selectively apply absorbers onto a layer to be solidified, which absorbers may be heated by means of laser light having a wavelength between 100 and 3000 nm and which absorbers emit their heat energy to the underlying layer, in which a sinter procedure takes place. By the absorption of shorter wavelengths the use of more cost-effective lasers is possible. However, again additional time for applying the absorber is necessary and moreover it is even proposed in DE 10 2004 012 682 A1 to irradiate the absorber pointwise with a laser, which does not lead to a remarkable saving in time compared to a conventional laser sintering method.

In view of the above-described problems it is an object of the present invention to provide a method for a layer-wise manufacturing of a three-dimensional object, which method is quick, accurate and cost-effective.

SUMMARY OF THE INVENTION

The present invention provides a method for a layer-wise manufacturing of a three-dimensional object having the steps:

a first step of providing a layer of a material in powder form or a liquid material onto a support or onto a layer that has already been solidified at selected positions, a second step of directing a focussed photon or particle beam (8') selectively onto selected positions of the layer, characterized in that in the second step the photon or particle beam is selected such that it induces a change of the absorption of the material when hitting the layer and after the termination of the second step a third step is carried out, in which the layer is irradiated with electromagnetic radiation (18') such that the material is homogenously solidified at those positions of the layer that correspond to the cross-section of the object to be formed.

The invention also provides a device for manufacturing a three-dimensional object by solidifying successively layers of a solidifiable material in powder form at positions corresponding to the cross-section of the object to be formed by means of radiation. In one embodiment the device has:

a support (4) having a substantially plane surface for supporting the object to be formed;

an application device (10) for applying a layer of the material onto the surface of the support or a layer that has been already at least partially solidified, an irradiation device (7) that is able to selectively direct an electromagnetic beam or a particle beam (8') onto the positions of the layer that correspond to the cross-section of the object or alternatively onto those positions of the layer that do not correspond to the cross-section of the object and a radiant heating (18), which is able to emit a radiation (18') having a maximum at a wavelength between 1000 and 6000 nm for heating the powder layer, characterized in that the device has a control device (19) that inserts a waiting time after the termination of the selective irradiation of the layer before a new layer is applied.

In another embodiment, a device has:

a support (4) having a substantially plane surface for supporting the object to be formed;

an application device (10) for applying a layer of the material onto the surface of the support or a layer that has been already at least partially solidified and an irradiation device (7) that is able to selectively direct a first electromagnetic beam or particle beam (8') onto the layer, characterized in that a second irradiation source (70) for selectively directing an electromagnetic beam or particle beam (80) onto the layer, wherein the second beam (80) has a higher power density than the first beam, is provided.

Further developments of the invention include methods having one or more of the following features:

the solidification in the third step is effected at those positions, at which the photon or particle beam (8') had been directed in the second step;

the solidification in the third step is effected at those positions, at which in the second step the photon or particle beam (8') had not been directed;

the photon or particle beam (8') is a laser beam;

the wavelength of the radiation lies between 300 and 10600 nm;

the second step a chemical reaction is initiated in the material by the photon or particle beam (8');

the second step a phase transition in the material is initiated by the photon or particle beam (8');

the second step a change of the density of the material is produced by the photon or particle beam (8');

an additive is added to the material in powder form or to the liquid material, wherein the absorption of the additive is changed in the second step;

the additive is nano-particles;

the maximum of the electromagnetic radiation (3) that is used in the third step lies in the wavelength region between 1000 and 6000 nm;

in the third step microwaves are used as electromagnetic radiation (3);

in the third step a second focussed photon or particle beam (80) is used for the irradiation of the layer;

a thermoplastic is used as material;

the thermoplastic is of a type which includes the group of polyethylenes (PE, HDPE, LDPE), polypropylenes (PP), polyamides, polyesters, polyester esters, polyether esters, polyphenylene ethers, polyacetals, polyalkylene terephthalates, in particular polyethylene terephthalate (PET) and polybutylene terephthalate (PBT), polymethyl-methacrylate (PMMA), polyvinylacetal, polyvinylchloride (PVC), polyphenylene oxide (PPO), polyoxymethylene (POM), polystyrene (PS), acrylonitrile-butadiene styrene (ABS), polycarbonates (PC), polyether sulphones, thermoplastic polyurethanes (TPU), polyether imides (PEI), polyarylene sulphides, in particular polyphenylene sulphide (PPS), thermoplastic polyimides (PI), polyamide-imides (PAI), polyvinylidene fluorides or co-polymers of these thermoplastics, mixtures and/or polymer blends;

a polyaryletherketone(PAEK)-powder or a polyaryletherketone (PAEK)/polyarylethersulfone (PAES) copolymer is used as material;

the material at least contains a powder from the group polyetheretherketone (PEEK), polyetherketoneketone (PEKK), polyetherketone (PEK), polyetheretherketoneketone (PEEKK), polyetheretheretherketone (PEEEK) or polyetherketoneetherketoneketone (PEKEKK); and/or the first and second step are repeatedly carried out in succession before the third step is carried out.

Additional developments of the invention include devices having one or more of the following features:

the control device increases the heating power of the radiant heating (18) during the waiting time; and/or a radiant heating (18) that is able to transmit a radiation (18') having a maximum at a wavelength between 1000 nm and 6000 nm for heating the powder layer and a control device (10) that inserts a waiting time after the termination of the selective irradiation of the layer with the second beam (80) before a new layer is applied.

According to the present invention the solidification of the building material is effected completely or partially by a large-area introduction of electromagnetic radiation such as by means of a radiant heater. In order to achieve nevertheless a selective solidification of the material only at those positions that correspond to the cross-section of the object to be formed, the absorption of the material in the layer is changed selectively before the large-area irradiation. This is done by directing a focussed photon or particle beam such as a laser beam to selected positions of the layer.

As by the large-area irradiation the material is melted simultaneously at all positions of the part cross-section, the building time is made shorter with respect to the prior art.

As in the present method it is not necessary to introduce so much energy into the layer by the photon and/or particle beam that a complete melting of the powder occurs, the scanning of the layer by means of the photon or particle beam may be faster as the irradiation time is reduced. In addition, the requirements for a cooling are lowered due to the reduced beam energy that is necessary. Thereby the whole scanner device becomes lighter and can be moved more easily which also reduces the time duration for the scanning of the layer by means of the beam.

As it is not necessary to obtain a sintering by means of the energy introduced by the laser alone, also lasers having wavelengths which are not in the infrared region may be used. Having a shorter wavelength these lasers can be focussed more precisely, whereby smaller structures at the part may be provided.

When an energetic IR laser (such as a $CO_2$ laser) is used in the present method, it becomes possible to use building materials (such as polyaryletherketones), which are difficult to melt completely by means of a laser beam alone due to their high melting points and their high melt viscosities. By the assisting selective melting by means of a radiant heater (post-sintering) the part properties can be improved with respect to a conventional method.

Finally, with the method according to the invention more homogeneous parts may be provided, because by the large-area melting local differences in the part properties such as the density, which differences occur in a pointwise solidification, may be compensated.

BRIEF DESCRIPTION OF THE DRAWINGS

Further features and advantages of the invention arise from the following description of embodiments based on the drawings, of which.

DETAILED DESCRIPTION OF THE INVENTION

First Embodiment

The first embodiment of the invention makes use of the fact that the powder material can change color due to the action of the electromagnetic radiation or particle radiation. As this was first observed for thermoplastic polymers, in the first embodiment as an example polyamide 66 powder is used as building material, wherein the polyamide 66 powder has not been thermally stabilized. However, also all other thermoplastics and thermo-elastics such as polyethylene (PE, HDPE, LDPE), polypropylene (PP), polyamides, polyester, polyester ester, polyether ester, polyphenylene ether, polyacetals, polyalkylene terephthalates, in particular polyethylene therephthalate (PET) and polybutylene terephthalate (PBT), polymethyl-methacrylate (PMMA), polyvinylacetal, polyvinylchloride (PVC), polyphenylene oxide (PPO), polyoxymethylene (POM), polystyrene (PS), acrylonitril-butadiene-styrene (ABS), polycarbonates (PC), polyether sulphones, thermoplastic polyurethanes (TPU), polyaryletherketones, in particular polyetheretherketone (PEEK), polyetherketoneketone (PEKK), polyetherketone (PEK), polyetheretherketoneketone (PEEKK), polyetheretheretherketone (PEEEK) or polyetherketoneetherketoneketone (PEKEKK), polyether imides (PEI), polyarylene sulphides, in particular polyphenylene sulphide (PPS), thermoplastic polyimides (PI), polyamide imides (PAI), polyvinylidene fluorides, as well as co-polymers of these thermoplastics such as a polyaryletherketone(PAEK)/polyarylethersulfone (PAES) copolymer, mixtures and/or polymer blends are equally applicable.

The method for manufacturing three-dimensional objects according to the invention is similar to the one that was described further above in connection with the laser sintering device that is shown in FIG. 3. Quartz radiators were used as heat radiators 18. However, also other configurations of the radiant heater are suited. The power of the heat radiators was adjusted such that before the start of an exposure of a newly applied powder layer the surface temperature of the powder layer was at 230° C. A $CO_2$ laser was used as laser, for which the power was set to be 30 watts and the interaction time was set to be 0.2 ms (scan velocity 3000 mm/s at a focus diameter of 600 μm), so that the exposed positions were noticeably browner than the un-exposed powder. After all positions corresponding to the cross-section of the object within the powder layer had been exposed, there was a waiting time of 30 seconds until the application of the next powder layer. During this time (post-sintering time or after-sintering time) the just exposed powder layer was exposed to the action of the radiant heating, the power of which was not changed. After the end of the 30 seconds waiting time a shining melt layer was visible, which melt layer had been formed under the influence of the radiant heater. The just described procedure for one powder layer was carried out in the same way for the other powder layers.

In the above method the difference to the prior art is that it was not the action of the laser, which led to a complete melting of the material, but it was the action of the radiant heater onto the (laser-)exposed regions. The laser only served for a selection of the regions to be solidified by the radiant heater. By the darker coloring of these regions their absorption for the heat radiation of the radiant heater was increased. By this increase of the absorption the exposed positions became hotter than the powder that had not been exposed and the exposed positions melted. Here one can adjust how much heat initially is introduced by the laser and one can adjust, whether the laser already brings about a partial melting of the powder. What is essential for the result is the additional absorption of the radiator energy.

Therefore, the single requirement for the introduced laser energy is the requirement that the introduced energy must bring about a change of the absorption of the powder material. As the amount of energy that is needed for this can be noticeably below the energy amount needed for a complete solidification of the powder, the duration of the laser action can be lowered with respect to the conventional method leading to a faster exposure. Moreover, also the laser power may be lowered, which also reduces the exposure time due to the reduced requirements to a cooling as described further above.

Also, it is possible to use lasers having a shorter wavelength than the $CO_2$ laser. A shorter wavelength in turn brings about a better focusability enabling a better resolution of details of the part. Here it depends on the powder material that is used, which wavelength of the laser light can be used. On the one hand the absorption for the laser light has to be good, on the other hand the wavelength has to be suited for bringing about changes of the absorption behaviour. Apart from these boundary conditions any laser wavelength (for example between 100 nm and 10600 nm) is suitable.

A change of the coloring and thereby the absorption of the powder or its melt under the action of electromagnetic radiation or particle radiation may have its cause on the one hand in chemical reactions that are triggered by the radiation. Here, in the first place a possible oxidation has to be mentioned. For instance, in the present embodiment the residual oxygen content was 3%. Furthermore, a discoloration can also be effected by phase transitions (e.g. semi-crystalline←→amorphous) or by cross-linking processes and agglomeration processes, respectively.

Second Embodiment

In order to increase the change of the absorption when electromagnetic radiation or particle radiation is applied, the base material that is used may be mixed with additives. These additives can change their absorption to such an extent that also a noticeable change of the absorption of the mixture can be observed. Furthermore, by the systematic adding of additives a sensitivity for a certain radiation (for example a radiation having a certain wavelength) can be brought about systematically. Here, the sensitivity can be increased for a directed beam for a selective exposure (for example for laser light having a certain wavelength). A systematic increase of the sensitivity for the radiant heater is also conceivable. As additives are possible all established colorants (dyes and pigments) that absorb in the UV-VIS and/or the infrared region additives that have their absorption maximum particularly in the near infrared region: such as Lumogen IR765 and Lumogen IR788 of BASF AG, black pigments such as carbon black, graphite, carbon fibers or carbon nano tubes, semiconductor materials (preferably based on oxides and sulphides such as antimony oxide, tin oxide, indium oxide, zinc oxide, zinc sulphide, tin sulphide or mixtures thereof) or substrates that have been coated by semiconductor materials (e.g. small mica plates, small $SiO_2$-plates, small $Al_2O_3$-plates, small glass plates, small aluminum plates, small BiOCl-plates, $SiO_2$ balls, $TiO_2$ balls, polymer balls, silica gel, Kieselguhr, glass balls, hollow glass balls, $TiO_2$ needles or mixtures of the substrates).

The additives may be added in amounts between 0.01-30% by weight, preferably 0.1-10% by weight.

The particle size of the pigments is between 0.01-150 μm, preferably 0.1-30 μm.

Fillers and flame proofing agents, which mainly scatter and absorb in the near infrared region.

Processing aids such as lubricants, stabilizers or nucleating agents which may directly or indirectly change the absorption by an effect on the crystallinity.

In the second embodiment use is made of the fact that an additive changes its absorption indirectly due to a phase change of the base material. For this, polyamide 12 is used as building material, to which carbon black particles have been added in a dry blend. Pure polyamide 12 appears white due to the reflexes at the many grain surfaces. The added carbon black particles are located on the surface of the grains, so that the powder appears grey.

The method according to the second embodiment is identical to the one of the first embodiment except that other parameters are chosen. Quartz radiators are used as heat radiators 18, however, also other types of radiant beatings are suited. The power of the heat radiators was set such that before the start of the exposure of a newly applied powder layer the surface temperature of the powder layer was at 175° C. A $CO_2$ laser was used as laser having a power of 30 watts and an interaction time of 0.12 ms (scan velocity 5000 mm/s at a focus diameter of 600 μm), which were set such that the powder grains started to melt and became transparent. As a result the regions that had been irradiated with the laser could be recognized due to their darker coloration.

The background for the colour change is that the powder being partially crystalline at first, which is opaque, at least partially passes into the amorphous phase (the melt is amorphous) due to the interaction with the laser beam. Due to the transparent colour of the powder areas that have been irradiated with the laser, carbon black particles from a larger depth now also shine through, so that the irradiated areas are darker.

A waiting time of 5 to 10 seconds was set in each case after all positions in one layer corresponding to the cross-section of the object to be manufactured had been exposed with the laser, so that the quartz radiators could act on this layer within the waiting time. By the increased absorption due to the darker colouring in the process the positions that had been previously irradiated with the laser could additionally absorb parts of the radiation spectrum of the quartz radiators. Thereby in these areas the melt adopted a lower viscosity, so that the density of the material increased, because pores in the material had an opportunity for an annealing.

In the present example a partial melting of the material by the laser had already occurred. By additionally making use of the energy introduced by the radiant heating, however, the interaction time of the laser radiation could be kept short leading to a higher velocity of the scanning process with the laser. Moreover, an improvement of the homogeneity resulted, because the energy that had been locally introduced by the laser was lower and thus smaller temperature gradients were present.

Finally it should be mentioned that by the introduction of additives a reduction of the absorption of the powder material due to a selective irradiation with the laser can also be effected. Then a subsequent irradiation by means of the radiant heating can be performed such that exactly those regions of a layer are solidified, in which the absorption was not lowered (inverse solidification).

Third Embodiment

In the third embodiment polyaryletherketone powder is used as building material. Polyaryletherketones as building material are particularly interesting, because parts manufactured from PAEK-powder feature a good bio-compatibility as well as a high resistance against hydrolysis and radiation. In particular, the thermal resistance also at elevated temperatures as well as the chemical resistance characterize PAEK-powders with respect to conventional plastic powders. Due to these properties PAEK materials are in demand particularly in the automotive and electronics industry as well as the medical industry. In particular, such a PAEK-polymer powder may be a powder from the group polyetheretherketone (PEEK), polyetherketoneketone (PEKK), polyetherketone (PEK), polyetheretherketoneketone (PEEKK) or polyetherketoneetherketoneketone (PEKEKK).

However, with respect to the powder sintering or melting PAEK-powders involve the disadvantage that the melting point of the material lies above 300° C. and thus particularly high amounts of energy have to be introduced by the laser. In this respect the method of the present invention can contribute to an improvement of the quality of the manufactured parts: as a part of the energy that is necessary for the powder solidification is provided by the radiant heating, a laser does not need to introduce so much energy locally. Due to the high melt viscosity of polyaryletherketones the absorption of additional energy from the heat radiation moreover enables a longer melting process of the powder particles. Thereby a smoothing of the melt film occurs.

The method according to the third embodiment is very similar to the one of the first and second embodiments.

The emitted radiation 18' of the used heat radiators has a spectrum in the VIS-region (visible light) and in the infrared region, whereby the emission maximum is in the near infrared. The power of the heat radiators was set such that before the start of the exposure of a newly applied powder layer the surface temperature of the powder layer was at 335° C. Due to the high building space temperature the method was carried out in a laser sintering device of the type EOS P700 that had been modified for such a high temperature.

Example 3a

A PEEK-powder supplied from the company Victrex having a melt viscosity of 0.15 kN*s/m² was used as building material, which powder was subjected to a thermal pre-treatment in a circulating air oven outside of the laser sintering device.

A $CO_2$ laser was used as laser having a power of 19 watts and an interaction time of 0.27 ms (scan velocity 2200 mm/s at a focus diameter of 600 μm), which were set such that the powder grains surface-fused and hence the areas that had been irradiated with the laser took on a darker colour.

In each case after all positions within one layer corresponding to the cross-section of the object to be manufactured had been exposed with the laser, a waiting time of 12 seconds was timed, wherein within this waiting time the heat radiators could act on this layer. By the increased absorption due to the darker colouring in the areas that had been irradiated with the laser, the melt adopted a lower viscosity so that the density of the material increased, because pores in the material had the opportunity to anneal.

Reference Example 3b

Figure 1:
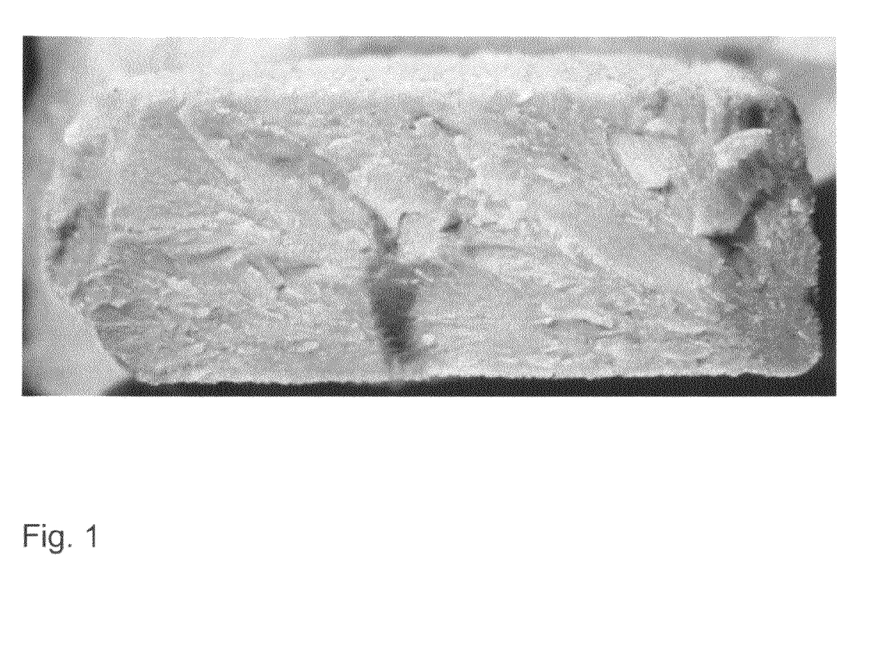
FIG. 1 shows an LM-micrograph (light-optical microscope-micrograph) of the fracture surface of a part that has been manufactured from the material PEEK, wherein the post-sintering time was 12 seconds.
Figure 2:
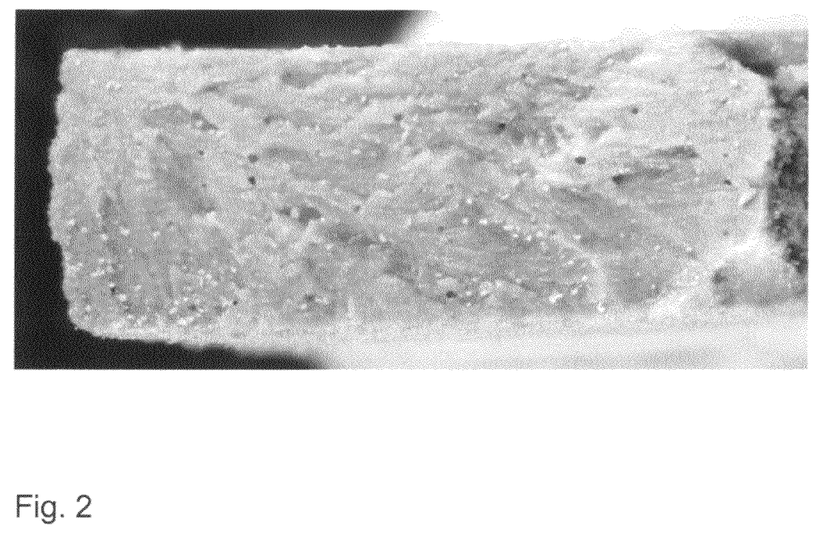
FIG. 2 shows an LM-micrograph of the fracture surface of a part that has been manufactured from the material PEEK without any post-sintering time.

For an evidence that the density of the part increases by the treatment with the radiant heating the above example 3a was repeated by omitting the interaction time (post-sintering time) of 12 seconds of the radiant heating. As it was the case also in the above example 3a, in each half of the building space a sample of 150×20×4 mm (length, width, height) was manufactured. Measurements of the density at the cooled-down samples showed a density of 1.308 g/cm³ without a post-sintering time (example 3b) and a density of 1.314 g/cm³ with a post-sintering time of 12 seconds (example 3a). The decrease of the porosity could also be observed optically when examining the fracture surface of a part by means of an LM-micrograph (see FIGS. 1 and 2). Without a post-sintering time the samples still had many pores (FIG. 2) while nearly dense parts could be obtained with a post-sintering time (FIG. 1).

Concerning the length of the post-sintering time the melting of the material is the more complete the longer this time is. It can be between 1 and 60 s. However, the higher the melt viscosity of the used polyaryletherketone, the longer the post-sintering time should be that is selected.

This is shown by reference example 3c:

In this reference example the method of example 3a was carried out with a PEEK powder, which had also been obtained from Victrex and had a starting value of the melt viscosity of 0.45 kN*s/m². The thermal pre-treatment was carried out in a circulating air oven like in example 3a. In order to achieve a part density of 1.313 g/cm, a post sintering time of 15 seconds instead of 12 seconds was necessary. Furthermore, for a post-sintering time having a too short duration or for the case that no post-sintering time is applied, differences in the density within one layer are observed. The reason is that within one layer the areas that have been exposed at first already undergo a post-sintering by the heating, while other areas in this layer are still exposed to the laser. Therefore, in the areas that have been exposed at first the post-sintering process lasts longer, because the radiant heating can act already during the exposure of the layer with the laser.

This can be seen from the following reference example 3d:

Analogous to the reference example 3b the PEEK powder was processed without a post-sintering time. However, in each half of the building space two samples instead of one sample having 150×20×4 mm (length, width, height) were manufactured. Density measurements at the cooled-off samples showed a change of the density depending on the order of exposure by the laser:

| Sample | Density [g/cm³] |
| --- | --- |
| No. 1 (in each layer exposed at first) | 1.312 |
| No. 2 (in each layer exposed at the end) | 1.308 |

Therefore, as a lower boundary for the post-sintering time the skilled person will set a time period starting with which a homogenous melt film is formed at each position in the building field independently from the time of exposure in the layer and as a result a uniformly high part density can be ensured at all positions.

However, there is also an upper limit for the post-sintering time: if the post-sintering time is set to be too long, so-called effects of complete sintering or over-sintering may result for polyaryletherketones having a low melt viscosity. These effects are present when the energy that is additionally introduced into the melt by the heating due to an interaction time that is too long, effects a heating of the melt that is so high that also loose powder outside of the part is melted or the melt can also spread beyond the limits of the part. Then the part grows too much locally ("buckle formation"), whereby the dimensional stability, the detail accuracy and the overall appearance of the parts is strongly affected.

Conventionally, before using a building material in a rapid prototyping method tests in advance are carried out with this material to get to know the properties of the material. Within these preliminary tests also an optimal post-sintering time for a material can be determined. For instance, this can be done by optically observing the melt film. To this effect the structure and texture, respectively, of the melt immediately after the termination of the exposure process (action of the laser beam) is compared to the structure of the melt depending on the duration of the action of the radiant heating. The optimal time duration for the post-sintering time is on hand, when a relevant smoothing of the melt texture can no longer be observed for an increase of this time. The value for the optimal time duration can be checked by density measurements.

The following post-sintering times for PAEK powders can be regarded as guide values:

For a polyaryletherketone having a melt viscosity that lies between 0.05 kN*s/m² and 0.25 kN*s/m² (measured in a capillary viscosimeter having a tungsten carbide duct of 0.5× 3.175 mm at 400° C. and a shear rate of 1000 s⁻¹ according to the test specification TM-VX-12 of Victrex plc.; see also US patent 2006/0251878 A1): at least 1 s, maximum 15 s, ideally 12 s.

For a polyarylketone having a melt viscosity that lies between 0.25 kN*s/m² and 0.50 kN*s/m²: at least 5 s, maximum 25 s, ideally 15 s.

For a polyaryletherketone having a melt viscosity that is larger than 0.5 kN*s/m²: at least 10 s, maximum 60 s, ideally 18 s.

Each of the above embodiments can be carried out by known laser-sintering devices that have been modified in the following way:

The device contains an operation control (19), which inserts a waiting time after each exposure process of a layer. Advantageously the waiting time, which is the same for all layers, should be adjustable by the user. It is even possible to provide differing waiting times for different layers, whereby parameter fluctuations are dealt with or part parameters can be specifically varied.

Preferably, the control of the radiant heating is able to increase the heating power during the waiting time.

In the above embodiments diverse modification possibilities of each respective embodiment have been described. These modifications are not limited to the respective embodiment. In particular, the invention can be modified also in the following way:

As in the method according to the invention the radiant heating does not only serve for a pre-heating of the powder, but also for a sintering/melting, differing from the prior art the regulation of the heating power can not only be effected in such a way that a constant surface temperature is kept during the building process. Rather, the power of the heat radiators can be specifically increased during the irradiation time that follows the exposure.

A heating, in which the maximum of the spectrum of the emitted radiation 18' lies in a wavelength region of 380 nm to 1000 μm (in particular between 1000 and 6000 nm) can be selected as radiant heating. For instance, a panel heating can be chosen. In particular, the use of microwave radiation (1 mm to 1 m) is also possible.

In the above embodiments normally an increase of the absorption by a change of colour was described. However, the absorption can be increased also in a different way. In particular, the conductivity of the material and as a result the absorption for microwave radiation can be changed for instance by an irradiation with the laser.

Though in the embodiments normally a laser is used, also other radiation sources may be applied that are able to emit a focussed directed beam. In particular, particle beams such as electron beams may be used for the exposure.

Moreover it is possible to add nano-particles as additive to the powder material, which nano-particles initially do not absorb the radiation of the heat radiators due to their small size. Here, an interaction with the laser light can lead to a swelling of the nano-particles (e.g. by an outgassing of low-molecular components), which then due to the size of the swollen particles are able to absorb the heat radiation.

Furthermore it is also possible to provide a waiting time (post-sintering time) not in each layer. Rather, this can be done only for each second, third, etc. layer.

Fourth Embodiment

Finally an embodiment, in which the solidification is not effected by means of a radiant heating, is also possible. Here, in addition to the irradiation source (7) having a directed beam that can be steered onto the powder surface, a second radiation source (70) of such type is provided. After the absorption in an applied powder layer at first has been selectively increased by means of the irradiation source (7), the actual selective solidification is effected by means of the second irradiation source (70). For this the directed beam (80) of the second irradiation source (a photon or particle beam) is successively directed to those positions in which the absorption has been previously increased by means of the irradiation source (7) and which correspond to the cross-section of the object in the applied powder layer.

The last-mentioned approach has the advantage that a beam having a very small focus can be used for changing the absorption, which beam allows the formation of very fine structures at the object to be produced. For the actual solidification a beam having a significantly higher power density may be used, which beam cannot and need not be focussed as precisely as the beam from the irradiation source (7). For instance, the absorption change can be effected by means of a UV laser that has a short wavelength and can be precisely focussed and the solidification can be effected by a powerful $CO_2$ laser having a long wavelength. Though the $CO_2$ laser has a larger focus, nevertheless very fine structures can be formed, because the solidification occurs only in those regions that have been pre-treated with a high resolution by means of the UV laser.

An assisting additional solidification by means of a radiant heater can be performed, however, depending on the powder starting material it is not mandatory.

Embodiments of the invention further contemplate that the first and second step are repeatedly carried out in succession before the third step, of complete melting or sintering, is carried out.

All other modifications that were mentioned in the other embodiments are equally applicable to the present embodiment. In particular, an "inverse solidification" meaning a selective inhibiting of the melting, is also possible.

The invention claimed is:

1. A method for a layer-wise manufacturing of a three-dimensional object, the method comprising the following steps:
   a first step of providing a layer of a material in a powder form onto a support or onto a prior layer;
   a second step of directing a focussed electromagnetic radiation or a focussed particle beam selectively onto selected positions of the layer;
   wherein, in the second step, the focussed electromagnetic radiation or particle beam is selected such that it induces a change of the absorption of the material when hitting the layer at the selected positions without complete melting or sintering; and
   after the second step, carrying out a third step, which is discrete from the second step, of completely melting or sintering the layer at those positions of the layer that correspond to the cross-section of the object to be formed using an electromagnetic radiation that is different from the focussed electromagnetic radiation or particle beam of the second step,
   wherein the first to third steps are repeatedly carried out until the object is completed, and
   wherein the solidification in the third step is effected at those selected positions at which the focussed electromagnetic radiation or particle beam had been directed in the second step.

2. The method according to claim 1, in which said focussed electromagnetic radiation is a laser beam.

3. The method according to claim 2, in which said laser beam consists of radiation having a wavelength of between about 300 nm and 10600 nm.

4. The method according to claim 1, in which the second step comprises initiating a chemical reaction in the material by the focussed electromagnetic radiation or particle beam.

5. The method according to claim 1, in which the second step comprises initiating a phase transition in the material by the focussed electromagnetic radiation or particle beam.

6. The method according to claim 1, in which the second step comprises producing a change of the density of the material by the focussed electromagnetic radiation or particle beam.

7. The method according to claim 1, wherein the material comprises an additive and wherein the absorption of the additive is changed in the second step.

8. The method according to claim 7, wherein the additive comprises nano-particles.

9. The method according to claim 1, in which the third step uses electromagnetic radiation having a maximum in the wavelength region between about 1000 nm and about 6000 nm.

10. The method according to claim 1, in which the third step comprises using microwaves as electromagnetic radiation.

11. The method according to claim 1, the material comprises a thermoplastic.

12. The method according to claim 11, in which the thermoplastic is selected from the group consisting of polyethylenes (PE, HDPE, LDPE); polypropylenes (PP); polyamides; polyesters; polyester esters; polyether esters; polyphenylene ethers; polyacetals; polyalkylene terephthalates; polymethylmethacrylate (PMMA); polyvinylacetal; polyvinylchloride (PVC); polyphenylene oxide (PPO); polyoxymethylene (POM); polystyrene (PS); acrylonitrilebutadiene styrene (ABS); polycarbonates (PC); polyether sulphones; thermoplastic polyurethanes (TPU); polyether imides (PEI); polyarylene sulphides; thermoplastic polyimides (PI); polyamideimides (PAI); polyvinylidene fluorides; co-polymers of these thermoplastics; and mixtures and polymer blends thereof.

13. The method according to claim 1, in which the material comprises a polyaryletherketone (PAEK) powder or a polyaryletherketone (PAEK)/polyarylethersulfone (PAES) copolymer.

14. The method according to claim 13, in which the material at least contains a powder selected from the group consisting of polyetheretherketone (PEEK), polyetherketoneketone (PEKK), polyetherketone (PEK), polyetheretherketoneketone (PEEKK), polyetheretheretherketone (PEEEK) and polyetherketoneetherketoneketone (PEKEKK).

15. A method for a layer-wise manufacturing of a three-dimensional object, the method comprising the following steps:
a first step of providing a layer of a material in a powder form onto a support or onto a prior layer;
a second step of directing a focused electromagnetic radiation or a focused particle beam selectively onto selected positions of the layer;
wherein, in the second step, the focused electromagnetic radiation or particle beam is selected such that it induces a change of the absorption of the material when hitting the layer at the selected positions without complete melting or sintering;
repeating the first and second steps prior to a third step which is carried out to solidify the layers provided by the repeated first and second steps;
after the repeated first and second steps, carrying out a third step, which is discrete from the second step, wherein the third step comprises irradiating the layer with a further electromagnetic energy that is different from that electromagnetic radiation of the second step such that the material is solidified by completely melting or sintering the layer at those positions of the layer that correspond to the cross-section of the object to be formed;
wherein the first to third steps are repeatedly carried out until the object is completed; and
wherein the solidification in the third step is effected at those selected positions at which the focused electromagnetic radiation or particle beam had been directed in the second step.

16. The method according to claim 12, wherein the thermoplastic is polyethylene terephthalate (PET) and polybutylene terephthalate (PBT).

17. The method according to claim 12, wherein the thermoplastic is polyphenylene sulphide (PPS).

18. The method according to claim 15, in which the third step uses electromagnetic radiation having a maximum in the wavelength region between about 1000 nm and about 6000 nm.

19. A method for a layer-wise manufacturing of a three-dimensional object, the method comprising the following steps:
providing a layer of a material in a powder form;
directing a focused electromagnetic radiation or a focused particle beam onto selected positions of the layer in a second step, wherein, in this second step, the focused beam is selected such that it induces a change of the absorption of the material when hitting the layer at the selected positions without complete melting or sintering; and
after the second step, carrying out a third step which is discrete from the second step, wherein the third step comprises irradiating the layer with electromagnetic radiation that is different from that electromagnetic radiation of the second step such that the material is completely melted or sintered at those positions of the layer to thereby form a solid cross-section of the object to be formed upon cooling,
wherein the first to third steps are repeatedly carried out until the object is completed, and
wherein the solidification in the third step is effected at those selected positions at which the focused beam had been directed in the second step.

20. A method for a layer-wise manufacturing of a three-dimensional object, the method comprising the following steps:
1) providing a layer of a material in a powder form;
2) directing a focused electromagnetic radiation or a focused particle beam onto selected positions of the layer in a preliminary step, wherein, in this preliminary step, the focused beam is selected such that it induces a change of the absorption of the material when hitting the layer at the selected positions but does not result in complete melting or sintering in this preliminary step; and
3) after the preliminary step, carrying out a solidification step of irradiating the layer with electromagnetic radiation which is different in character from that of the preliminary step such that the material is completely melted or sintered at those positions of the layer to thereby form upon cooling a solid cross-section of the object being formed;
wherein steps 1 through 3 are repeatedly carried out until the object is completed, and
wherein the solidification step is effected at those selected positions at which the focused beam had been directed.

* * * * *

UNITED STATES PATENT AND TRADEMARK OFFICE
CERTIFICATE OF CORRECTION

PATENT NO. : 9,011,982 B2
APPLICATION NO. : 12/154655
DATED : April 21, 2015
INVENTOR(S) : Muller et al.

It is certified that error appears in the above-identified patent and that said Letters Patent is hereby corrected as shown below:

On the title page item 73 please delete the following:

"Assignee: EOS GmbH Electro Optical Systems, (Krailing, DE)"

And replace with:

Assignee: EOS GmbH Electro Optical Systems, (Krailling, DE)

Signed and Sealed this
Sixth Day of October, 2015

Michelle K. Lee
*Director of the United States Patent and Trademark Office*